(12) United States Patent
Svihla et al.

(10) Patent No.: US 9,598,091 B2
(45) Date of Patent: Mar. 21, 2017

(54) AIR INTAKE SYSTEM FOR AN ENGINE

(71) Applicant: Electro-Motive Diesel, Inc., LaGrange, IL (US)

(72) Inventors: Gary R. Svihla, Burr Ridge, IL (US); Joshua D. Schueler, New Lenox, IL (US); Pradeep Ganesan, Chicago, IL (US)

(73) Assignee: Electro-Motive Diesel, Inc., La Grange, IL (US)

( * ) Notice: Subject to any disclaimer, the term of this patent is extended or adjusted under 35 U.S.C. 154(b) by 173 days.

(21) Appl. No.: 14/500,478

(22) Filed: Sep. 29, 2014

(65) Prior Publication Data

US 2016/0090948 A1  Mar. 31, 2016

(51) Int. Cl.
| | |
|---|---|
| *F02M 35/10* | (2006.01) |
| *B61C 5/04* | (2006.01) |
| *F02M 25/07* | (2006.01) |
| *F02M 35/024* | (2006.01) |
| *B61C 5/02* | (2006.01) |
| *B01D 39/00* | (2006.01) |

(Continued)

(52) U.S. Cl.
CPC ............ *B61C 5/04* (2013.01); *B01D 39/00* (2013.01); *B61C 5/02* (2013.01); *F02M 25/0711* (2013.01); *F02M 35/0215* (2013.01); *F02M 35/02466* (2013.01); *F02M 35/10104* (2013.01); *F02M 35/10124* (2013.01); *F02M 35/10157* (2013.01); *F02M 35/164* (2013.01); *F02M 35/10144* (2013.01); *F02M 35/10321* (2013.01); *F02M 35/10347* (2013.01); *F02M 35/112* (2013.01); *F05C 2225/08* (2013.01)

(58) Field of Classification Search
CPC ........... F02M 35/10321; F02M 35/112; F02M 35/10347; F02M 35/0144; F05C 2225/08
USPC ..................................................... 123/184.21
See application file for complete search history.

(56) References Cited

U.S. PATENT DOCUMENTS

| | | | | |
|---|---|---|---|---|
| 4,179,860 A | * | 12/1979 | Reale ..................... | E04C 3/08 403/384 |
| 7,093,589 B2 | | 8/2006 | Sorersen et al. | |

(Continued)

FOREIGN PATENT DOCUMENTS

| | | |
|---|---|---|
| CN | 202628334 | 12/2012 |
| EP | 2196659 A1 | 6/2010 |

(Continued)

OTHER PUBLICATIONS

U.S. Patent Application of Gary R. Svihla et al., entitled "Engine System for Emissions Compliance" filed on Sep. 29, 2014.

*Primary Examiner* — Lindsay Low
*Assistant Examiner* — Charles Brauch
(74) *Attorney, Agent, or Firm* — Finnegan, Henderson, Farabow, Garrett & Dunner, LLP

(57) ABSTRACT

An air intake system is disclosed. The air intake system may have an air box. The air box may be configured to receive air from an ambient. The air intake system may also have a filter assembly disposed within the air box. The filter assembly may be configured to clean the air. In addition, the air intake system may have a duct. The duct may have a first duct end configured to receive the air exiting the filter assembly. The duct may also have a second duct end configured to deliver the air to the engine. The second duct end may be located at a gravitationally higher position than the first duct end.

20 Claims, 4 Drawing Sheets

(51) Int. Cl.
*F02M 35/16* (2006.01)
*F02M 35/02* (2006.01)
*F02M 35/112* (2006.01)

(56) References Cited

U.S. PATENT DOCUMENTS

| | | |
|---|---|---|
| 7,571,608 B2 | 8/2009 | Boyapati et al. |
| 8,146,359 B2 | 4/2012 | Currie et al. |
| 8,146,542 B2 | 4/2012 | Cattani et al. |
| 8,365,527 B2 | 2/2013 | Raab et al. |
| 8,555,637 B2 | 10/2013 | Nakae et al. |
| 8,746,217 B2 | 6/2014 | Piper et al. |
| 8,793,982 B2 | 8/2014 | Patel et al. |
| 2005/0247284 A1* | 11/2005 | Weber ............... F01L 13/0015 123/299 |
| 2007/0283697 A1* | 12/2007 | Winsor ............... F01N 3/023 60/605.1 |
| 2008/0041328 A1* | 2/2008 | Granatelli ............ F02M 35/021 123/184.21 |
| 2008/0280715 A1* | 11/2008 | Monden ............... C03C 25/1015 474/203 |
| 2009/0241868 A1* | 10/2009 | Morita ................ B62K 11/04 123/54.4 |
| 2011/0029201 A1* | 2/2011 | Holt .................. A01D 69/03 701/41 |
| 2013/0209291 A1* | 8/2013 | Kitsukawa ............ F02B 37/013 417/410.1 |
| 2014/0041384 A1 | 2/2014 | Mischler et al. |

FOREIGN PATENT DOCUMENTS

| | | |
|---|---|---|
| JP | 2004-257333 | 9/2004 |
| WO | WO 2013/103169 A1 | 7/2013 |
| WO | WO 2013/121962 A1 | 8/2013 |

\* cited by examiner

AIR INTAKE SYSTEM FOR AN ENGINE

TECHNICAL FIELD

The present disclosure relates generally to an air intake system and, more particularly, to an air intake system for an engine.

BACKGROUND

An internal combustion engine typically includes an air intake system that supplies air for combustion to combustion chambers of the engine. The air intake system can include one or more filters to clean the air before air enters the combustion chambers. Additionally, to improve combustion efficiency and to generate more power, modern engines often include turbochargers to help compress the air before delivering the air to the engine. Engines must also minimize the discharge of unburnt fuel, particulate matter such as soot, and harmful gases such as carbon monoxide or nitrous oxide into the atmosphere to comply with strict emissions control regulations. Therefore, engines are also equipped with after-treatment components to clean the exhaust before discharging it into the air.

The air handling and after-treatment components typically occupy a significant volume around the engine. Moreover, the presence of turbochargers and after-treatment components leaves little room to locate an air intake system within close proximity to the corresponding turbocharger inlet(s). As a result, a remotely located air intake system may convey air to the turbochargers via contoured ducting and/or airflow turning mechanisms. The design of the ducting and air flow turning mechanisms to deliver air to the engine with minimum pressure loss can present a challenge.

One attempt to address some of the problems described above is disclosed in U.S. Pat. No. 7,093,589 of Sorersen et al. that issued on Aug. 22, 2006 ("the '589 patent"). In particular, the '589 patent describes a system that enables enhanced air flow to the air intake of an internal combustion engine having a turbocharger. The '589 patent discloses a clean air duct that receives air from an air filter and delivers the air to a turbocharger. The '589 patent further discloses that the clean air duct integrates a diffuser, a plenum, a bell-mouth transition and the turbocharger inlet. The '589 patent also discloses that the plenum replaces one or more bends or elbows within the clean air duct. In addition, the '589 patent discloses that the plenum, diffuser and the duct effectuate a 180 degree change in the direction of flow of induction air with a minimum of system head loss.

Although the air induction system of the '589 patent may reduce system head loss, it may still be less than optimal. In particular, the air induction system of the '589 patent may still require a significant amount of ducting to supply air to a multi-stage turbocharging arrangement used in certain power system applications. The system of the '589 patent may also require added ducting to ensure that intake air does not get heated by radiant heat from the exhaust system of the engine. The extra ducting may increase costs, increase pressure losses, and may make it difficult to access the air handling components for maintenance or repair. The extra ducting may also make it difficult to fit the air intake system and the engine in the space available for certain engine system applications.

The air intake system of the present disclosure solves one or more of the problems set forth above and/or other problems of the prior art.

SUMMARY

In one aspect, the present disclosure is directed to an air intake system. The air intake system may include an air box. The air box may be configured to receive air from an ambient. The air intake system may also include a filter assembly disposed within the air box. The filter assembly may be configured to clean the air. In addition, the air intake system may include a duct. The duct may have a first duct end configured to receive the air exiting the filter assembly. The duct may also have a second duct end configured to deliver the air to the engine. The second duct end may be located at a gravitationally higher position than the first duct end.

In another aspect, the present disclosure is directed to an engine system. The engine system may include an engine having an accessory end and a drive end opposite the accessory end. The engine system may also include an air intake system located adjacent the accessory end. The air intake system may be configured to deliver air to the engine. The engine system may further include a turbocharger arrangement located adjacent the accessory end. The turbocharger arrangement may be configured to receive air from the air intake system and deliver compressed air to the engine. The engine system may also include an air cooling arrangement located adjacent the accessory end. The air cooling arrangement may be configured to receive the compressed air from the turbocharger arrangement, cool the compressed air, and deliver the compressed air to the engine. The engine system may further include a mixing duct extending from the accessory end to the drive end. The mixing duct may be configured to receive exhaust from the turbocharger arrangement. In addition, the engine system may include an after-treatment system located adjacent the drive end. The after-treatment system may be configured to receive the exhaust from the mixing duct, treat the exhaust, and discharge the exhaust to an ambient.

DETAILED DESCRIPTION

Figure 1:
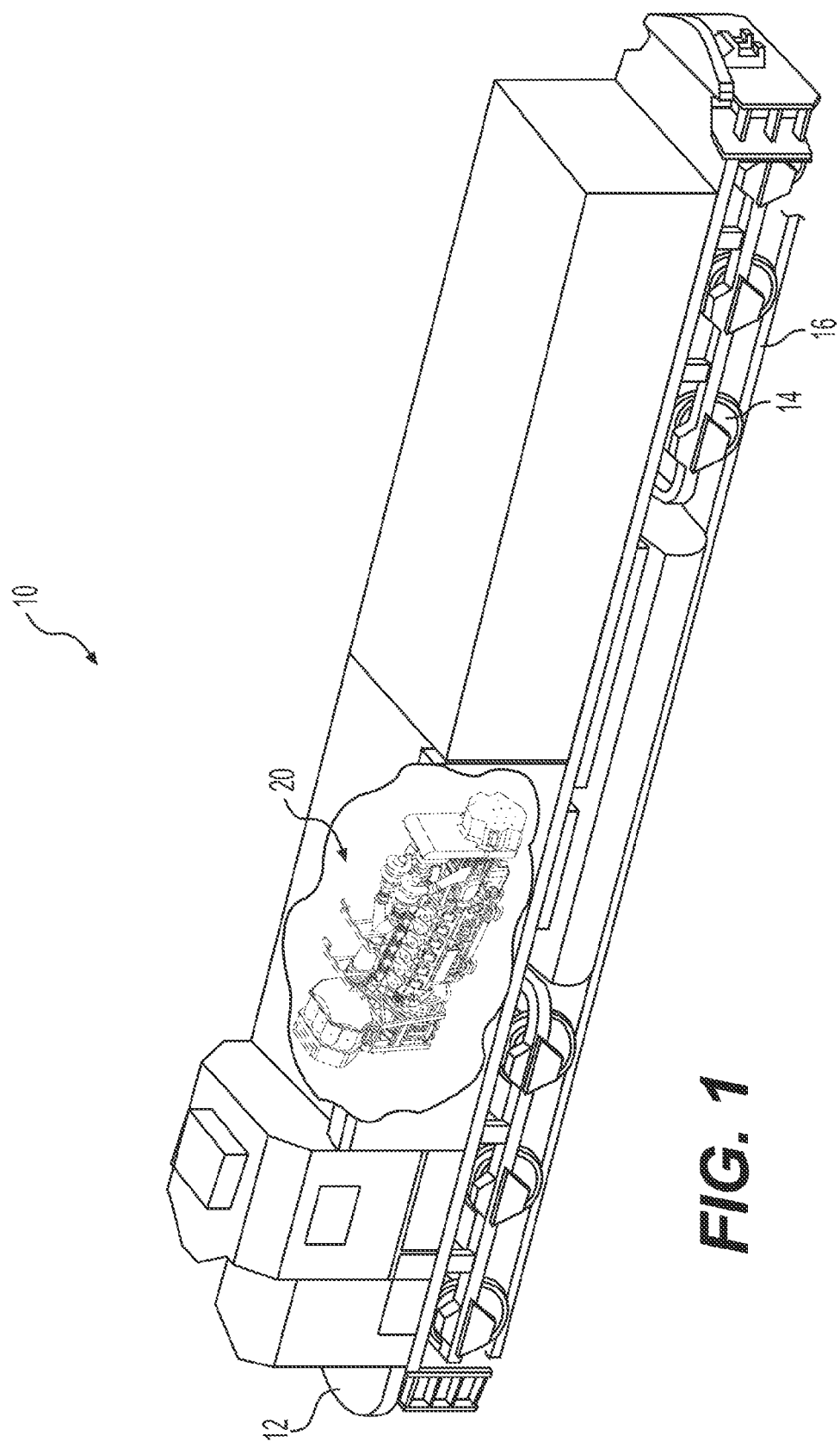
FIG. 1 is a pictorial illustration of an exemplary disclosed machine equipped with an engine system.

FIG. 1 illustrates an exemplary embodiment of a machine 10. Machine 10 may be a machine that performs some type of operation associated with an industry such as railroad, marine, power generation, mining, construction, farming, or another industry known in the art. For example, as shown in FIG. 1, machine 10 may be a locomotive designed to pull rolling stock. Machine 10 may have a platform 12 supported by a plurality of wheels 14, which may be configured to engage track 16. Wheels 14 may have traction motors (not shown) associated with them, which may drive wheels 14 to propel machine 10 in a forward or rearward direction.

Machine 10 may have an engine system 20 mounted on platform 12. In one exemplary embodiment, as shown in FIG. 1, engine system 20 may be lengthwise aligned on platform 12 along a travel direction of machine 10. One skilled in the art will recognize, however, that engine system 20 may be located in tandem, transversally, or in any other orientation on platform 12, as desired.

Figure 2:
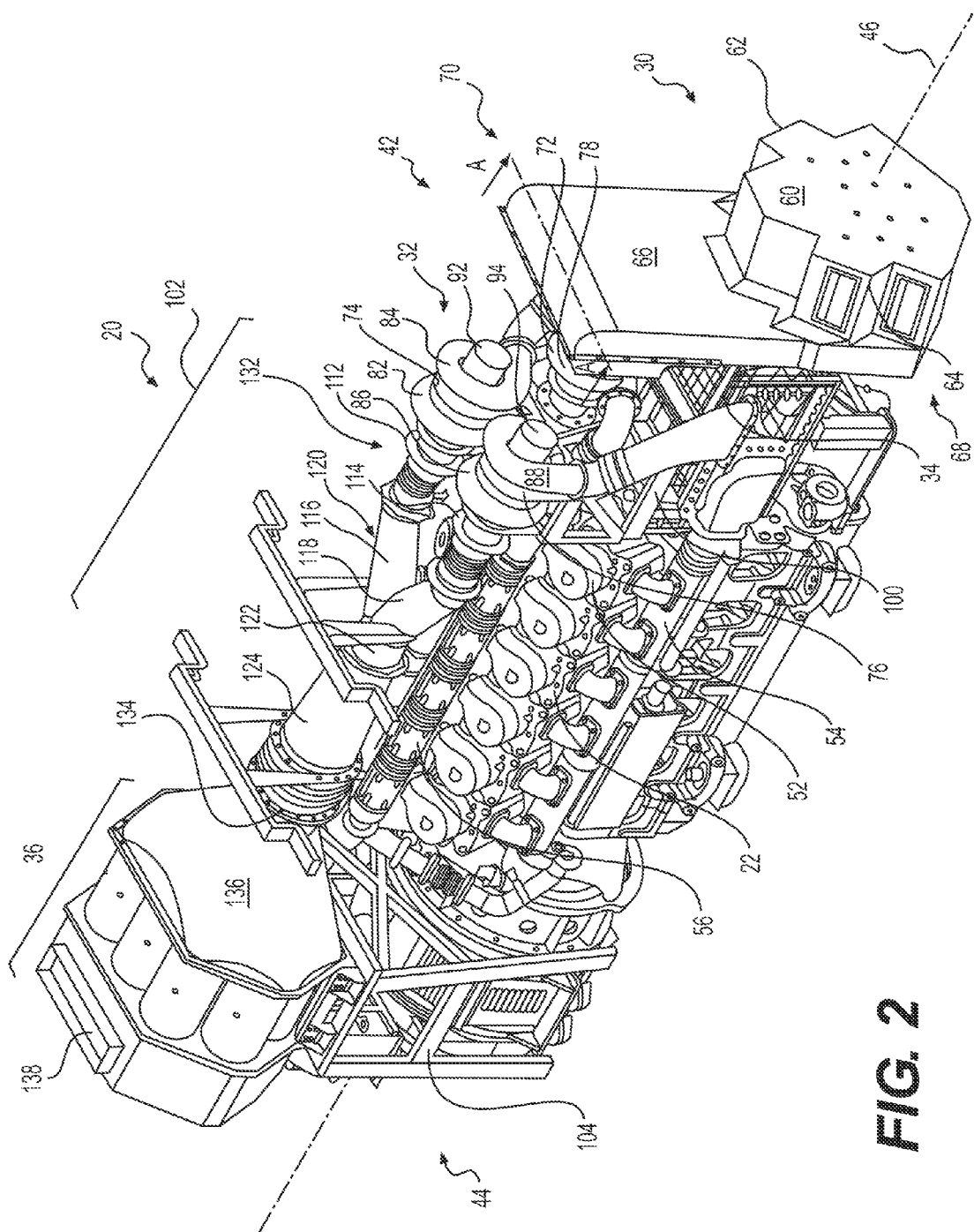
FIG. 2 is a diagrammatic view of the exemplary disclosed engine system of FIG. 1.

FIG. 2 illustrates a diagrammatic view of an exemplary embodiment of engine system 20. As shown in FIG. 2, engine system 20 may include engine 22, an air intake system 30, a turbocharger arrangement 32, an air cooling arrangement 34, and an after-treatment system 36. Engine system 20 may have an accessory end 42 and a drive end 44 opposite accessory end 42 along a longitudinal axis 46 of engine 22. Air intake system 30, turbocharger arrangement 32, and air cooling arrangement 34 may be located adjacent accessory end 42 of engine 22. Thus, air intake system 30, turbocharger arrangement 32, and air cooling arrangement 34 may be located nearer to accessory end 42 relative to drive end 44. After-treatment system 36 and systems to transfer motive power from engine 22 to propel wheels 14 (see FIG. 1) of machine 10, for example, gear systems (not shown), drivetrain (not shown), etc. may be located adjacent drive end 44 of engine 22. Thus, after-treatment system 36 may be located nearer drive end 44 relative to accessory end 42. Air intake system 30, turbocharger arrangement 32, and air cooling arrangement 34 may cooperate to provide cooled and compressed fresh air to engine 22.

Engine 22 may be a four-stroke diesel engine. It is contemplated that engine 22 may be another type of engine, for example, a two-stroke diesel engine, a two-stroke or four-stroke gasoline engine, or a two-stroke or four-stroke gaseous-fuel-powered engine. Engine 22 may include a plurality of cylinders 52, an intake manifold 54, and an exhaust manifold 56. Intake manifold 54 may direct cooled and compressed air to cylinders 52 of engine 22. Cylinders 52 may burn fuel to generate motive force and discharge exhaust gases via exhaust manifold 56. Exhaust gases from exhaust manifold 56 may propel one or more turbochargers in turbocharger arrangement 32 before being discharged into the atmosphere. Although, only six cylinders of engine 22 are visible in FIG. 2, it is contemplated that engine 22 may have any number of cylinders 52. Likewise, although only one intake manifold 54 and one exhaust manifold 56 are shown in FIG. 2, it is contemplated that engine 22 may have any numbers of intake manifolds 54 and exhaust manifolds 56. In one exemplary embodiment, cylinders 52 of engine 22 may be arranged in a V-shaped configuration. It is contemplated, however, that cylinders 52 of engine 22 may be arranged in an inline configuration, in an opposing-piston configuration, or in any other configuration known in the art.

Air intake system 30 may include air box 60, first filter bank 62, second filter bank 64, and duct 66. Air from the ambient may enter air box 60 via first and second filter banks 62, 64. First and second filter banks 62, 64 may include one or more components, which may be configured to clean the air by removing particulate matter, such as dust, from the air. Duct 66 may be connected to air box 60 at first duct end 68. Duct 66 may extend from first duct end 68 to second duct end 70. Duct 66 may be configured to direct air from air box 60 to turbocharger arrangement 32. As illustrated in FIG. 2, first and second filter banks 62, 64 may be disposed in a V-shaped arrangement. It is contemplated, however, that first and second filter banks may be arranged opposing each other or in any other arrangement known in the art. Although FIG. 2 illustrates only two filter banks, it is contemplated that air intake system 30 may include any number of first filter banks 62 and second filter banks 64.

Turbocharger arrangement 32 may include a high-pressure turbocharger 72, a first low-pressure turbocharger 74, and a second low-pressure turbocharger 76. Splitting the low-pressure turbocharger stage into first and second low-pressure turbochargers 74, 76 may allow high-pressure turbocharger 72 and first and second low-pressure turbochargers 74, 76 to be of about equal size. In one exemplary embodiment, high-pressure turbocharger 72 and first and second low-pressure turbochargers 74, 76 may be of identical size. Implementing high-pressure turbocharger 72 and first and second low-pressure turbochargers 74, 76 of similar size may reduce the number of unique components required to manufacture, service, or repair high-pressure turbocharger 72 and first and second low-pressure turbochargers 74, 76. Although FIG. 2 illustrates only one high-pressure turbocharger 72, and two low-pressure turbochargers 74, 76, it is contemplated that engine system 20 may have any number of high-pressure turbochargers 72 and any number of first and second low-pressure turbochargers 74, 76.

High-pressure turbocharger 72 may include high-pressure turbine 78 and high-pressure compressor (not shown). High-pressure turbine 78 may receive exhaust from exhaust manifold 56, which may propel high-pressure turbine 78. High-pressure turbine may in turn drive high-pressure compressor via, for example, a common drive shaft. First low-pressure turbocharger 74 may include first low-pressure turbine 82 and first low-pressure compressor 84. First low-pressure turbine 82 may receive a portion of the exhaust exiting high-pressure turbine 78. Exhaust received from high-pressure turbine 78 may propel first low-pressure turbine 82, which may in turn drive first low-pressure compressor 84 via, for example, a common drive shaft. Second low-pressure turbocharger 76 may include second low-pressure turbine 86 and second low-pressure compressor 88. Second low-pressure turbine 86 may receive a remaining portion of the exhaust from high-pressure turbine 78. Exhaust received from high-pressure turbine 78 may propel second low-pressure turbine 86, which may in turn drive second low-pressure compressor 88 via, for example, a common drive shaft. Exhaust from first and second low-pressure turbines 82, 86 may be directed to after-treatment system 36.

First and second low-pressure compressors 84, 88 may draw fresh air received from duct 66 of air intake system 30 via first inlet 92 and second inlet 94, respectively. First and second low-pressure compressors 84, 88 may compress the air to a first pressure level, and direct the pressurized air to air cooling arrangement 34. Air cooling arrangement 34 may cool the pressurized air and direct the cooled and compressed air to high-pressure turbocharger 72. High-pressure turbocharger 72 may receive the pressurized air from air cooling arrangement 34 and increase the pressure of the air to a higher level. Compressed air from high pressure turbocharger 72 may re-enter air cooling arrangement 34, which may further cool the air and direct the cooled air to intake manifold 54. It is contemplated that high-pressure and low-pressure may be relative terms and do not denote specific pressures. In one exemplary embodiment, high-pressure compressor of high-pressure turbocharger 72 may compress air to a pressure level that is about two to five times the pressure level of the air compressed by low-pressure compressors 84, 88. Each of high-pressure compressor, and first and second low-pressure compressors 84, 88 may embody a fixed geometry compressor, a variable geometry compressor, or any other type of compressor configured to receive air and compress the air to a desired pressure level.

Air cooling arrangement 34 may include one or more coolers (not shown) to cool compressed air received from turbocharger arrangement 32. It is contemplated that air cooling arrangement 34 may have separate coolers to cool compressed air received from high pressure turbocharger 72, as compared to the compressed air received from first and second low-pressure turbochargers 74, 76. The one or more coolers in air cooling arrangement 34 may embody air-to-air heat exchangers, liquid-to-air heat exchangers, or combinations of both, and may be configured to facilitate the transfer of thermal energy away from the compressed air passing through air cooling arrangement 34. The thermal energy transferred away from the compressed air may be absorbed into a flow of coolant, for example air, glycol, water, a water/glycol mixture, a blended air mixture, or another coolant known in the art. The coolant may be circulated through air cooling arrangement 34 via a separate coolant loop (not shown) and pump (not shown).

As further illustrated in FIG. 2, high-pressure turbocharger 72, first and second low-pressure turbochargers 74, 76, and air cooling arrangement 34 may be attached to a support structure 100, which may be attached to engine 22. First and second low-pressure turbochargers 74, 76 may be disposed at a gravitationally higher position than high-pressure turbocharger 72. Additionally or alternatively, turbocharger arrangement 32 including high-pressure turbocharger 72, and first and second low-pressure turbochargers 74, 76 may be disposed at a gravitationally higher position than air cooling arrangement 34. In one exemplary embodiment, high-pressure turbocharger 72 may be located at a length-wise center of air cooling arrangement 34, with first and second low-pressure turbochargers 74, 76 disposed on either side of high-pressure turbocharger 72. Turbocharger arrangement 32 including high-pressure turbocharger 72, and first and second low-pressure turbochargers 74, 76 may also be disposed at a gravitationally higher position than air box 60 of air intake system 30. Although FIG. 2 illustrates one exemplary geometric arrangement of high-pressure turbocharger 72, first and second low-pressure turbochargers 74, 76, air box 60, and air cooling arrangement 34, it is contemplated that these components may be arranged in any other order or relative gravitational position. For example, first and second low-pressure turbochargers 74, 76 may be disposed at the same gravitational location relative to air box 60 and on either side of high-pressure turbocharger 72. It is also contemplated that high-pressure turbocharger 72 and first and second low-pressure turbochargers 74, 76 may be attached to air cooling arrangement 34 instead of being attached to support structure 100.

As shown in FIG. 2, locating air intake system 30, turbocharger arrangement 32 and air cooling arrangement 34 at accessory end 42 of engine 22 may minimize an amount of ducting required to allow exhaust from engine 22 to be directed to turbocharger arrangement 32. The disclosed arrangement of these components may also help minimize an amount of ducting required to allow fresh air to be directed from air intake system 30 to first and second inlets 92, 94 of first and second low-pressure turbochargers 74, 76, respectively.

After-treatment system 36 may be located adjacent to drive end 44 of engine 22. After-treatment system 36 may receive exhaust from first and second low-pressure turbines 82, 86 via mixing duct 102. After-treatment system 36 may treat the exhaust before discharging the exhaust into an ambient. After-treatment system 36 may include one or more diesel oxidation catalysts (DOC) (not shown), one or more diesel particulate filters (DPF) (not shown) and/or any other type of after-treatment components known in the art. After-treatment system 36 may be attached to alternator structure 104 located adjacent drive end 44 of engine 22. It is contemplated, however, that after-treatment system 36 may additionally or alternatively be supported by support structure 100 via a cantilevered frame, which may be attached using vertical support members to engine 22 adjacent to drive end 44. Alternator structure 104 may support various components, for example, one or more alternators (not shown), which may be driven by engine 22 to generate electricity to drive the traction motors (not shown) to propel wheels 14 (see FIG. 1) of machine 10 (see FIG. 1).

Treatment of exhaust gases in after-treatment system 36 may require a relatively long distance between first and second outlets 112, 114 of first and second low-pressure turbochargers 74, 76, respectively, and DOCs in after-treatment system 36. A longer distance may allow both good diffusion and gas/hydrocarbon mixing. Moreover, performance of DOCs may depend upon maintaining a uniform mass flow distribution across all incoming surface areas of the DOCs. As shown in FIG. 2, exhaust exiting first and second low-pressure turbochargers 74, 76 via first and second outlets 112, 114 may enter first and second legs 116, 118, respectively of adapter 120 and may exit adapter 120 via third leg 122. A duct 124 may receive exhaust from adapter 120 and deliver the exhaust to after-treatment system 36. In one exemplary embodiment, duct 124 may have a conical shape. Adapter 120 and duct 124 may comprise a mixing duct 102. As illustrated in the embodiment shown in FIG. 2, mixing duct 102 may be disposed over the center of engine 22 along a longitudinal axis 46 of engine 22. Mixing duct 102 may have a first end 132 connected to first and second outlets 112, 114 of first and second low-pressure turbines 82, 86, respectively, and a second end 134 connected to a transition duct 136. Transition duct 136 may connect mixing duct 102 to after-treatment system 36, which may treat the exhaust received from mixing duct 102 before releasing the exhaust to the atmosphere via outlet 138.

As illustrated in FIG. 2, exhaust manifold 56, and mixing duct 102 may be disposed at a gravitationally higher position relative to intake manifold 54 and air box 60. Exhaust manifold 56 and mixing duct 102 may carry hot exhaust from cylinders 52 to after-treatment system 36. As a result, ambient air surrounding exhaust manifold 56 and mixing duct 102 may be heated by heat radiating from exhaust manifold 56 and mixing duct 102. Because warm air rises due to its lower density, the heated ambient air surrounding exhaust manifold 56 and mixing duct 102 may remain at a gravitationally higher position relative to the cooler ambient air surrounding air box 60. Thus, by locating air box 60 at a gravitationally lower position compared to exhaust manifold 56 and mixing duct 102, air intake system 30 may help ensure that relatively cooler air may be supplied to first and second low-pressure compressors 84, 88.

Figure 3:
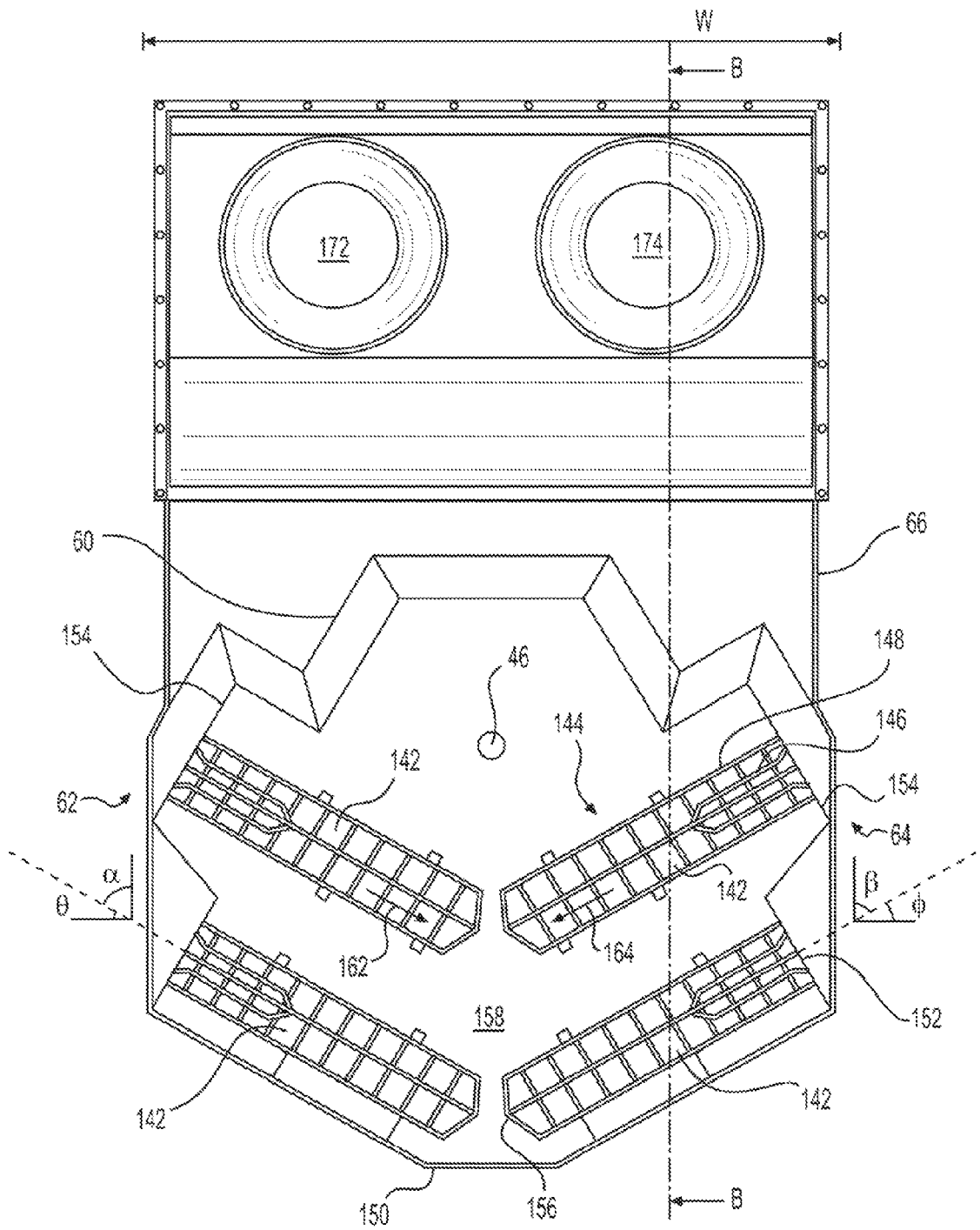
FIG. 3 is a cut-away view of an exemplary disclosed air intake system associated with the engine system of FIG. 2.

FIG. 3 illustrates a cut-away view of air intake system 30 along line A-A of FIG. 2. As illustrated in FIG. 3, first and second filter banks 62, 64 may include one or more filter assemblies 142. In one exemplary embodiment, filter assembly 142 may include a mesh of glass fibers embedded with a viscous, sticky coating. Each filter assembly may have a bag-like trapping volume 144 having a shape defined by an inner wire basket 146 and an outer wire basket 148. It is contemplated that filter assemblies 142 may include wire mesh filters or any other type of air filters known in the art.

First filter bank 62 may be disposed at an angle relative to second filter bank 64. For example, first filter bank 62 may be disposed at an angle "θ" relative to base 150 of air box 60 and at a complimentary angle "α" relative to a plane generally orthogonal to base 150. Second filter bank 64 may be disposed at an angle "φ" relative to base 150 and at a complimentary angle "β" relative to a plane generally orthogonal to base 150. It is contemplated that angles θ, φ, α, and β may have the same or different values. Although, FIG. 3 illustrates that all filter assemblies 142 in each of first and second filter banks 62, 64 are inclined at a generally similar angle relative to base 150, it is contemplated that each filter assembly 142 in each of first and second filter banks 62, 64 may be inclined at any angle. Orienting the first and second filter banks 62, 64 at an angle, as illustrated in FIG. 3, may also help ensure that filter assemblies 142 may be easily removed from first and second filter banks 62, 64 for cleaning, maintenance, or repair. For example, disposing first and second filter banks 62, 64 at angles α and β relative to a plane generally orthogonal to base 150 may make it easier to pull filter assemblies 142 out of first and second filter banks 62, 64.

Each filter assembly 142 may have an intake end 152 configured to receive ambient air from adjacent side 154 of air box 60. Air may travel through filter assembly 142 and may leave filter assembly 142 via discharge end 156. As illustrated in FIG. 3, discharge end 156 of filter assembly 142 may be located at a gravitationally lower position relative to intake end 152. A first portion of air may enter plenum 158 of air box 60 from first filter bank 62 in a first direction 162, which may be generally orthogonal to side 154 and inclined with respect to base 150. A second portion of air may enter plenum 158 from second filter bank 64 in a second direction 164, which may be generally orthogonal to side 154 and inclined with respect to base 150. In one exemplary embodiment as illustrated in FIG. 3, first and second directions 162, 164 may be generally opposite to each other. The first and the second portions of air may exit plenum 158 in a third direction 166 (see FIG. 4), which may be orthogonal to both first and second directions 162, 164. For example, with respect to FIG. 3, the air may exit plenum 158 in a third direction 166 generally orthogonal to and out of the page. One of ordinary skill in the art would recognize that by placing the broader surfaces of filter assemblies 142 generally parallel to longitudinal axis 46, air may exit each filter assembly 142 at a relatively low velocity into plenum 158 and exit out of plenum 158 with minimal impediment. Orienting the filter assemblies in this manner may also reduce the formation of wakes adjacent to discharge end 156 as air leaves each filter assembly 142, thereby minimizing the pressure loss in air box 60.

Duct 66 may receive the air from plenum 158 and discharge the air through first and second openings 172, 174. Second opening 174 may be spaced apart from first opening 172. First and second openings 172, 174 may have a circular shape as illustrated in FIG. 3. It is contemplated, however, that first and second openings 172, 174 may have an elliptical, rectangular, polygonal, or any other shape known in the art. In one exemplary embodiment, a first portion of the air in duct 66 may exit first opening 172 and enter first inlet 92 of first low-pressure turbine 84 (see FIG. 2). Similarly, for example, a second portion of the air in duct 66 may exit second opening 174 and enter second inlet 94 of second low-pressure compressor 88 (see FIG. 2). First and second openings 172, 174 may be connected to first and second inlets 92, 94, respectively with ducts (not shown).

Figure 4:
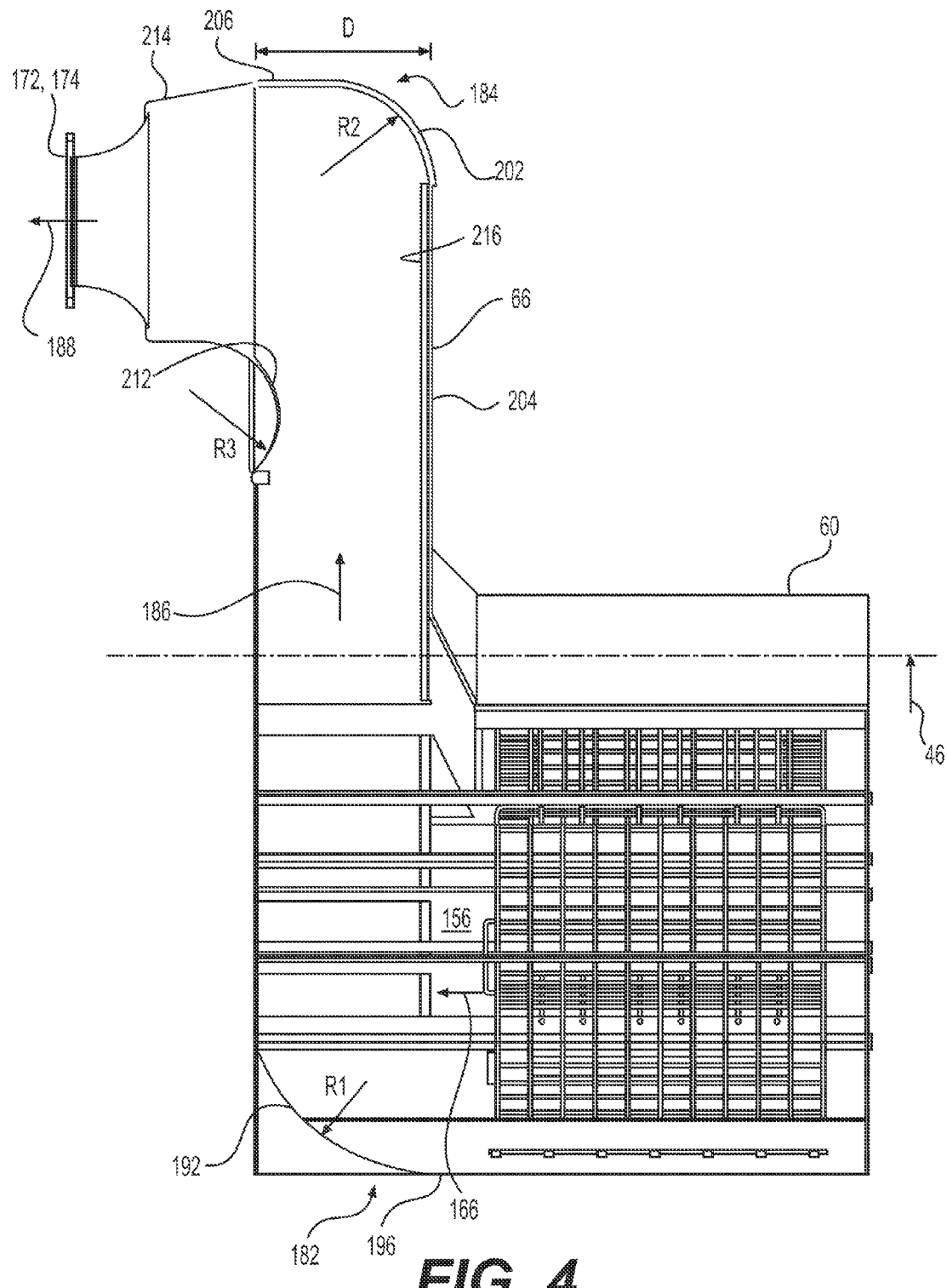
FIG. 4 is another cut-away view of the exemplary disclosed air intake system associated with the engine system of FIG. 2.

FIG. 4 illustrates another cut-away view of the exemplary disclosed air intake system 30 along line B-B of FIG. 3. As illustrated in FIG. 4, duct 66 may have a depth "D," which may be smaller than a width "W" (see FIG. 3) of duct 66. Duct 66 may receive air from plenum 158 adjacent first duct end 182 and discharge air via second opening 174 adjacent second duct end 184. Thus, duct 66 may receive air from plenum 158 at a location nearer first duct end 182 compared to second duct end 184. As illustrated in FIG. 4, first duct end 182 may be located at a gravitationally lower position relative to second duct end 184. Air may travel from first duct end 182 to second duct end 184 in a fourth direction 186, which may be generally orthogonal to third direction 166. Air may exit duct 66 adjacent to second duct end 184 via first opening 172 (see FIG. 3) and second opening 174 in a fifth direction 188, which may be generally orthogonal to fourth direction 186 and generally parallel to third direction 166.

Duct 66 may include a first smoothing feature 192, which may help the air turn from third direction 166 to fourth direction 186. First smoothing feature 192 may be a curved duct surface, which may connect front wall 194 with bottom wall 196 of duct 66. Front wall 194 may be generally orthogonal to longitudinal axis 46 and bottom wall 196 may be generally parallel to longitudinal axis 46. First smoothing feature 192 may have a width about equal to width W of duct 66. In one exemplary embodiment, curved duct surface may have a radius "R1," which may be about equal to 20% of depth D. It is also contemplated that first smoothing feature 192 may be a chamfered duct section, which may be an inclined flat surface extending from front wall 194 to bottom wall 196.

Duct 66 may also include a second smoothing feature 202, which may help the air turn from fourth direction 186 to fifth direction 188. Like first smoothing feature 192, second smoothing feature 202 may be a curved duct surface, which may connect rear wall 204 with top wall 206 of duct 66. Rear wall 204 may be located opposite front wall 194. Rear wall 204 may be disposed generally parallel to front wall 194 and generally orthogonal to longitudinal axis 46. Top wall 206 may be located opposite bottom wall 196. Top wall 206 may be disposed generally parallel to bottom wall 196 and longitudinal axis 46. Second smoothing feature 202 may have a width about equal to width W of duct 66. Second smoothing feature 202 may have a radius "R2," which may be about 20% of depth D. It is also contemplated that second smoothing feature 202 may be a chamfered duct section, which may be an inclined flat surface extending from rear wall 204 to top wall 206.

Duct 66 may include a third smoothing feature 212, which may be disposed on front wall 194 and located adjacent second opening 174. Thus, third smoothing feature 212 may be located nearer second duct end 184 relative to first duct end 182. Third smoothing feature 212 may include a recessed duct surface attached to front wall 194. Third smoothing feature 212 may have a width about equal to width W of duct 66. The recessed duct surface may have a bend radius "R3," which may be about 20% of depth D of duct 66. First, second, and third smoothing features 192, 202, 212 may cooperate to turn the air from third direction 166 to fourth direction 186 and from fourth direction 186 to fifth direction 188 with minimum pressure loss. Duct 66 may also include a converging nozzle portion 214, which may help direct the air from duct 66 uniformly across first and second openings 172, 174.

As illustrated in FIG. 4, duct 66 may also include one or more tie bars 216 which may be attached to rear wall 204 of duct 66. Tie bars 216 may be structural stiffeners designed to strengthen rear wall 204 to help ensure rear wall 204 may be able to carry structural loads. For example, rear wall 204 reinforced with tie bars 216 may be used to attach other engine components including hoses, cables, and or other ducting to air intake system 30. Although FIG. 4 illustrates tie bar 216 only on rear wall 204, it is contemplated that one or more tie bars 216 may be attached to front wall 194, top wall 206, and/or bottom wall 196 of duct 66. The cross-section of tie bars 216 may be selected such that tie bars 216 do not introduce flow disturbances in the air flowing in duct 66 so as to minimize pressure losses in duct 66.

INDUSTRIAL APPLICABILITY

The disclosed air intake system 30 may be implemented in any power system application being packaged in a limited amount of volume available to accommodate the power system. The disclosed air intake system 30 may be simple and robust, and may offer enhanced application opportunities because of its compact size and improved serviceability. In particular, locating air intake system 30, turbocharger arrangement 32, and air cooling arrangement 34 adjacent to accessory end 42 of engine 22 may reduce an overall packaging size of engine system 20. For example, by locating air intake system 30, turbocharger arrangement 32, and air cooling arrangement 34 in close proximity, a smaller amount of ducting may be required to convey air from the ambient to first and second inlets 92, 94 of first and second low-pressure compressors 84, 88, respectively. Reducing the amount of ducting may reduce the cost of air intake system 30 and may also help minimize the pressure losses through air intake system 30. The disclosed air intake system 30 may also provide relatively cool intake air to engine 22 by locating air box 60 at a gravitationally lower position relative to exhaust manifold 56 and mixing duct 102. In addition, the arrangement of first and second filter banks 62, 64 may make it easier to clean, repair, or replace filter assemblies 142.

Referring to FIGS. 2, 3, and 4, air may enter air box 60 through first and second filter banks 62 and 64. Within first and second filter banks 62, 64, air may pass through one or more filter assemblies 142, where particulate matter such as dust may be removed from the air by the filter assemblies 142. Air may exit from filter assemblies 142 in first and second filter banks 62, 64 into plenum 158 in first and second directions 162, 164, respectively. Air may travel in plenum 158 in a third direction 166, which may be generally orthogonal to first and second directions 162, 164. From plenum 158, air may enter duct 66 adjacent first duct end 182. First smoothing feature 192 may help the air turn from third direction 166 to fourth direction 186, which may be generally orthogonal to third direction 166. Air may travel through duct 66 from first duct end 182 to first and second openings 172, 174 adjacent second duct end 184. Air may turn from fourth direction 186 to fifth direction 188 adjacent second duct end 184. Second and third smoothing features 202 and 212 may help the air to turn from fourth direction 186 to fifth direction 188, which may be generally orthogonal to fourth direction 186 and generally parallel to third direction 166. First, second, and third smoothing features 192, 202, 212 may cooperate to minimize pressure losses as air travels from intake end 152 of filter assemblies 142 through plenum 158 and duct 66 to first and second openings 172, 174.

Referring to FIG. 2, by locating air box 60 at a gravitationally lower level compared to exhaust manifold 56 and mixing duct 102, air intake system 30 may help engine system 20 take advantage of the temperature gradient in the ambient air surrounding engine system 20. For example, because exhaust manifold 56 and mixing duct 102 carry hot exhaust gases, a temperature of the ambient air surrounding the exhaust manifold 56 and mixing duct 102 may be significantly higher than a temperature of the ambient air surrounding air box 60. The temperature gradient in the air surrounding engine system 20 may become even more important when engine system 20 is located on a machine 10 that travels through, for example, a long tunnel. Because of the confined space in the tunnel and because hot exhaust from engine 22 may be discharged nearer a roof of the tunnel, air near the roof of the tunnel may be much hotter than air surrounding air box 60 located at a gravitationally lower position relative to exhaust outlet 138. Thus, by locating air box 60 at a gravitationally lower position relative to exhaust manifold 56 and mixing duct 102, air intake system 30 may help ensure that relatively cooler air is delivered to first and second low-pressure compressors 84, 88 of engine 22. Further, by locating air box 60 at gravitationally lower position relative to outlet 138, air intake system 30 may help ensure that filter assemblies 142 do not get fouled by particulate matter in the exhaust gases being discharged from outlet 138.

It will be apparent to those skilled in the art that various modifications and variations can be made to the disclosed air intake system. Other embodiments will be apparent to those skilled in the art from consideration of the specification and practice of the disclosed air intake system. It is intended that the specification and examples be considered as exemplary only, with a true scope being indicated by the following claims and their equivalents.

What is claimed is:

1. An air intake system for an engine, comprising,
an air box configured to receive air from an ambient, and including an air box front wall with an air box front outlet port, an air box first side wall with a first air box inlet port, an air box second side wall with a second air box inlet port, an air box rear wall, and a longitudinal axis through the air box from the air box rear wall to the air box front wall;
a filter assembly disposed within the air box and configured to clean the air, including a first filter bank removably disposed at the first air box inlet port, and a second filter bank removeably disposed at the second air box inlet port; and
an elongated duct including:
a duct bottom portion,
a duct top portion,
a duct front wall with a duct front outlet port at the duct top portion and a front wall curved portion adjacent the duct front outlet port,
a duct rear wall with a duct rear inlet port at the duct bottom portion fluidly connected to the air box front outlet port,
a duct bottom wall having a bottom wall curved portion adjacent the duct front wall, and
a duct top wall having a top wall curved portion adjacent the duct rear wall; and
a converging nozzle portion including a rear nozzle inlet port fluidly connected to the duct front outlet port, a first front nozzle outlet port, and a second front nozzle outlet port; and
wherein the air intake system defines an air path through the first air box inlet port and the second air box inlet port, through the filter assembly, through the air box in the direction of the longitudinal axis, through the air box front outlet port and the duct rear inlet port, through the duct from the duct bottom portion to the duct top portion, through the duct front outlet port and the rear nozzle inlet port, through the converging nozzle portion, through the first front nozzle outlet port and the second front nozzle outlet port and to the engine.

2. The air intake system of claim 1, wherein:
the first filter bank including a first plurality of filter assemblies; and
the second filter bank including a second plurality filter assemblies; and
the first filter bank and the second filter bank are disposed at an angle relative to each other.

3. The air intake system of claim 2, wherein the air box includes a plenum configured to:
receive a first portion of the air from the first filter bank, the first portion entering the plenum from the first filter bank in a first direction;
receive a second portion of the air from the second filter bank, the second portion entering the plenum from the second filter bank in a second direction; and
deliver the first portion and the second portion of the air to the air box front outlet port in a third direction generally orthogonal to both the first direction and the second direction.

4. The air intake system of claim 3, wherein the duct is arranged such that the air flows in the duct in a fourth direction generally orthogonal to the third direction.

5. The air intake system of claim 4, wherein the bottom wall curved portion is configured to help turn the air from the third direction to the fourth direction.

6. The air intake system of claim 1, wherein:
the duct includes a depth between the duct front wall and the duct rear wall; and
the bottom wall curved portion has a radius about equal to 20% of the depth.

7. The air intake system of claim 5, wherein
the duct top wall and the converging nozzle portion are configured such that the air flows out of the first nozzle outlet port and the second nozzle outlet port in a fifth direction generally orthogonal to the fourth direction and generally parallel to the third direction.

8. The air intake system of claim 3, wherein each of the first filter assemblies and the second filter assemblies includes:
an intake end configured to receive the air from the ambient; and
a discharge end configured to deliver the air to the plenum, the discharge end being located at a gravitationally lower position than the intake end.

9. The air intake system of claim 3, wherein each of the first filter assemblies and the second filter assemblies includes a mesh of glass fibers embedded with a viscous sticky coating.

10. The air intake system of claim 1, wherein the duct includes at least one tie bar attached to the duct rear wall.

11. An engine system, comprising:
an engine having an accessory end and a drive end opposite the accessory end;
the air intake system of claim 1 located adjacent the accessory end;
a turbocharger arrangement located adjacent the accessory end, the turbocharger arrangement including a first turbocharger with a first compressor, and a second turbocharger with a second compressor, the first compressor fluidly connected to the first front nozzle outlet port, the second compressor fluidly connected to the second from nozzle outlet port, the turbocharger arrangement configured to receive exhaust from the engine;
an air cooling arrangement located adjacent the accessory end, the air cooling arrangement including an air cooler configured to receive compressed air from the turbocharger arrangement, cool the compressed air, and deliver the compressed air to an intake manifold of the engine, the air cooling arrangement and the intake manifold positioned gravitationally lower than the turbocharger arrangement;
a mixing duct extending from the accessory end to the drive end and configured to receive the exhaust from the turbocharger arrangement and positioned gravitationally higher than the air box, the air cooling arrangement, and the intake manifold; and
an after-treatment system located adjacent the drive end, the after-treatment system being configured to receive the exhaust from the mixing duct, treat the exhaust, and discharge the exhaust to an ambient through an exhaust outlet, the exhaust outlet positioned gravitationally higher than the air box, the air cooling arrangement, and the intake manifold.

12. The engine system of claim 11, wherein the air box is located at a gravitationally lower position than the turbocharger arrangement.

13. The engine system of claim 11, wherein the air box includes a plenum configured to:
receive the air from the first filter bank, the first filter bank being oriented such that the air enters the plenum from the first filter bank in a first direction;
receive the air from the second filter bank, the second filter bank being oriented such that the air enters the plenum from the second filter bank in a second direction, and
deliver the air to the air box front outlet port, the duct being oriented such that the air enters the air box front outlet port in a third direction generally orthogonal to both the first direction and the second direction.

14. The engine system of claim 13, wherein air flows in the duct in a fourth direction generally orthogonal to the third direction.

15. The engine system of claim 14, wherein the air flows through the first nozzle outlet port and the second nozzle outlet port in a fifth direction generally orthogonal to the fourth direction and generally parallel to the third direction.

16. The engine system of claim 15, wherein
the bottom wall curved portion is configured to help turn the air from the fourth direction to the fifth direction.

17. A machine comprising:
a platform;
a plurality of wheels configured to support the platform;
an engine configured to propel the wheels, the engine including:
an accessory end;
a drive end opposite the accessory end;
at least one intake manifold configured to deliver air to the engine for combustion; and
at least one exhaust manifold configured to discharge exhaust produced by the combustion;
a high-pressure turbocharger located adjacent the accessory end, the high-pressure turbocharger including a high-pressure compressor and a high-pressure turbine configured to be propelled by the exhaust from the engine to drive the high-pressure compressor;
a first low-pressure turbocharger located adjacent the accessory end, including:
a first low-pressure turbine; and
a first low-pressure compressor, the first low-pressure turbine being configured to be propelled by a portion of the exhaust received from the high-pressure turbine and drive the first low-pressure compressor;

a second low-pressure turbocharger located adjacent the accessory end, including:
  a second low-pressure turbine; and
  a second low-pressure compressor, the second low-pressure turbine being configured to be propelled by a remaining portion of the exhaust received from the high-pressure turbine and drive the second low-pressure compressor;

an air intake system including:
  an air box configured to receive the air from an ambient, and including an air box front wall with an air box front outlet port, an air box first side wall with a first air box inlet port, an air box second side wall with a second air box inlet port, an air box rear wall, and a longitudinal axis through the air box from the air box rear wall to the air box front wall;
  a filter assembly disposed within the air box and configured to clean the air, including a first filter bank removably disposed at the first air box inlet port, and a second filter bank removably disposed at the second air box inlet port; and
  an elongated duct including:
    a duct bottom portion,
    a duct top portion,
    a duct front wall with a duct front outlet port at the duct top portion and a curved portion adjacent the duct front outlet port,
    a duct rear wall with a duct rear inlet port at the duct bottom portion fluidly connected to the air box front outlet port,
    a duct bottom wall having a curved portion adjacent the duct front wall, and
    a duct top wall having a curved portion adjacent the duct rear wall; and
  a converging nozzle portion including a rear nozzle inlet port fluidly connected to the duct front outlet port, a first front nozzle outlet port fluidly connected to the first low-pressure compressor, and a second front nozzle outlet port fluidly connected to the second low-pressure compressor;

an air cooling arrangement located adjacent the accessory end and configured to:
  cool the air received from the high-pressure turbocharger, the first low-pressure turbocharger and the second low-pressure turbocharger; and
  deliver the air to the at least one intake manifold;

a mixing duct extending from the accessory end to the drive end, the mixing duct being configured to receive the exhaust from the first low-pressure turbine and the second low-pressure turbine; and an after-treatment system located adjacent the drive end and configured to receive the exhaust from the mixing duct, treat the exhaust, and discharge the exhaust to the ambient; and wherein the air box, the air cooling arrangement, and the at least one intake manifold are located at a gravitationally lower position than the high pressure turbocharger, the first low pressure turbocharger, the second low pressure turbocharger, the mixing duct, and the after-treatment system.

18. The air intake system of claim 1, wherein:
the duct includes a depth between the duct front wall and the duct rear wall; and
the top wall curved portion has a radius about equal to 20% of the depth.

19. The air intake system of claim 1, wherein:
the duct includes a depth between the duct front wall and the duct rear wall; and
the front wall curved portion has a radius about equal to 20% of the depth.

20. The air intake system of claim 1, wherein:
the air box includes an air box top wall including a top surface; and
the top surface intersects an outer surface of the duct rear wall at a line below the front wall curved portion.

* * * * *